United States Patent [19]

McKeegan et al.

[11] Patent Number: 5,574,651
[45] Date of Patent: Nov. 12, 1996

[54] METHOD AND SYSTEM FOR MACHINING MUNTIN SECTIONS AND SEATING BARS

[76] Inventors: John McKeegan, 45866 Denise Dr., Plymouth, Mich. 48170; Rodney E. Bracy, 11805 Davis Rd., Middleville, Mich. 49330

[21] Appl. No.: 342,583

[22] Filed: Nov. 21, 1994

[51] Int. Cl.⁶ ............................ G06F 17/00; G06F 19/00
[52] U.S. Cl. .................. 364/474.02; 364/476.01; 29/897.31; 29/795
[58] Field of Search .................. 364/474.01, 474.02, 364/476; 29/791, 795, 796, 897, 897.3, 897.31, 892.32; 428/38

[56] References Cited

U.S. PATENT DOCUMENTS 5,117,366  5/1992  Stong ........................ 364/474.02
5,295,292  3/1994  Leopold ........................ 29/417

*Primary Examiner*—Paul P. Gordon
*Attorney, Agent, or Firm*—Weintraub, DuRoss & Brady

[57] ABSTRACT

A system and method for machining muntin sections and seating bars for assembly into muntin lattices using machines that notch and crimp the muntin sections and a device that pierces the seating bars. The notching machine has a notching device that forms notches in the muntin section. The crimping machine has a crimping device that forms dimples in a portion of the notched muntin sections. The piercing machine has a piercing device which forms apertures in the seating bar to receive muntin section keepers. The crimped muntin sections are assembled to the non-crimped muntin sections to create the pattern for the lattice with the dimples locking the muntin sections together. The assembled muntin sections are assembled to the seating bars using the keepers to produce an assembled lattice which is inserted between or upon glass panes of a door or window.

11 Claims, 4 Drawing Sheets

FIG 4
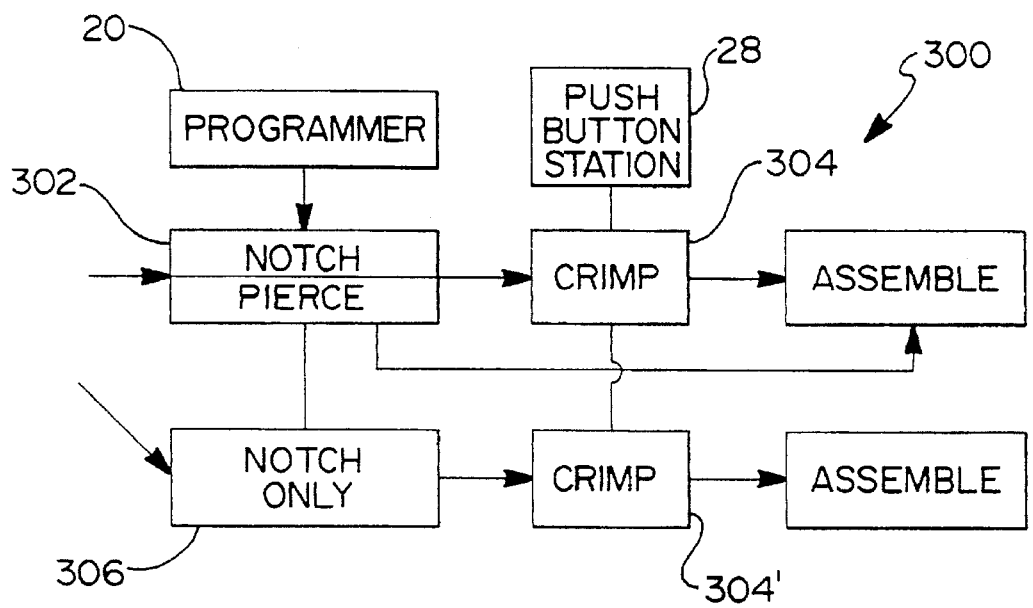
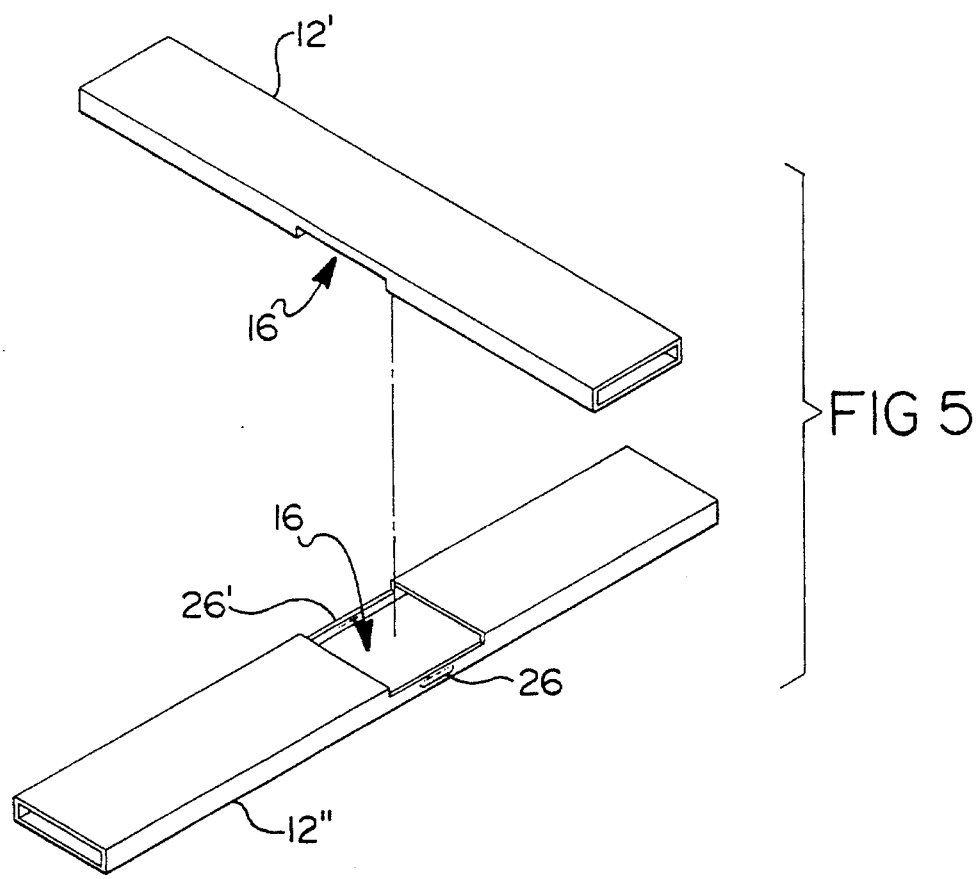
FIG 5

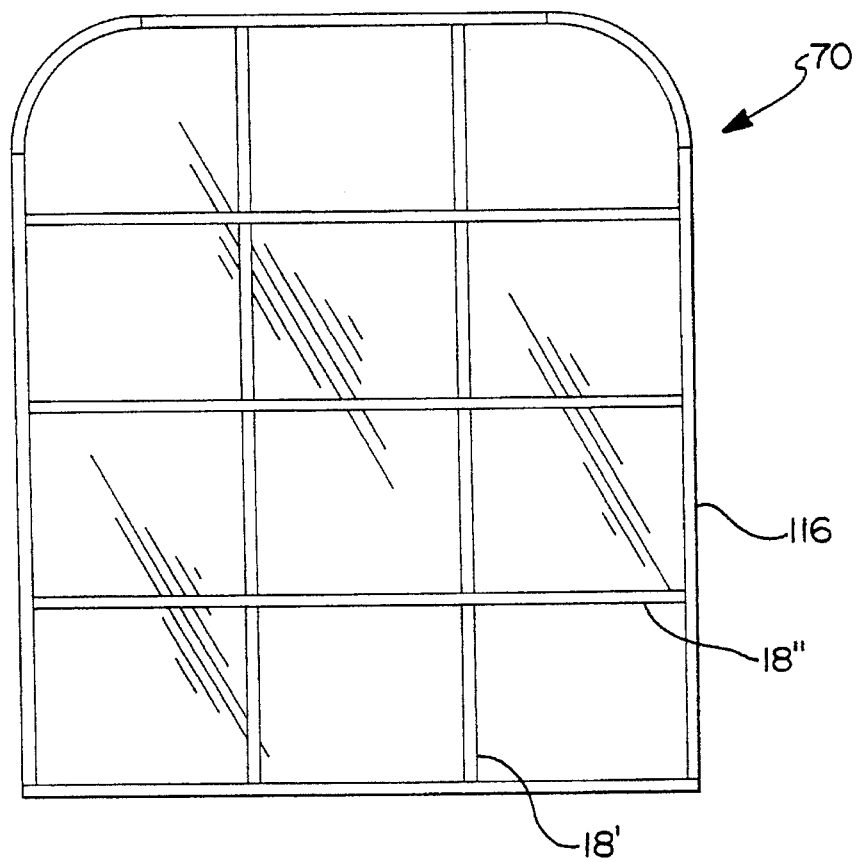

METHOD AND SYSTEM FOR MACHINING MUNTIN SECTIONS AND SEATING BARS

I. FIELD OF THE INVENTION

The present invention relates to a method and system for machining muntin sections and muntin seating bars. More specifically, the invention relates to a method and system for notching and crimping muntin sections and piercing muntin seating bars.

II. DESCRIPTION OF THE PRIOR ART

Traditionally, muntins or muntin lattices have been used as decorative dividers or spacers between or outside panes of glass used for windows and doors. Because muntin lattices are frequently utilized between glass panes, they are difficult to service should the sections of the lattices become separated. Muntin sections which become separated between the glass panes may come in contact with the panes and cause stress thereon. In insulated windows, muntin sections in contact with the glass panes also reduce the insulating ability of the window.

Loose lattice sections on the outside surfaces of glass panes, on the other hand, have a tendency to become lost or damaged, thus requiring replacement. A replacement muntin section may be a different color or shade than existing muntin sections, thereby destroying the aesthetic beauty of a muntin lattice until the replacement section ages to the shade of the original sections.

Muntin lattices may have a plurality of muntin sections crossing each other to provide for an aesthetically pleasing or decorative configuration. Originally, the lattices were created by placing a series of long muntin sections in one direction, usually parallel to each other. Smaller muntin sections were aligned in several rows between the longer sections. Usually, the aligned smaller sections were parallel to each other and normal to the longer sections.

Because the above muntin lattices contained an inordinate number of muntin sections which could easily be moved or lost, a method of cutting notches in the longer muntin sections has been developed which permits long muntin sections to be placed upon each other by merging them at the notches. The notches are formed in the muntin sections by using saws to cut the notches within the muntin sections.

The notches reduce the number of pieces to be handled, but because the notches are sawed, the edges of the notches develop burrs which interfere with assembly. Thus, the burrs need to be removed before assembling the muntins. Sawing the notches also causes variations in the size of the notches which results in loose fits or, as in many cases, no fit.

Because of the loose fitting muntin sections, many sections still come apart after installation. Again, this results in lost or damaged muntin sections.

A system and method of producing consistent muntin section notches without burrs which remain attached together after assembly and result in high quality muntin lattices is highly desired. It is to this to which the present invention is directed.

SUMMARY OF THE PRESENT INVENTION

The present invention provides a system for machining muntin sections, which comprises:

(a) at least one muntin section notching unit, the unit including a notching device for forming at least one notch in a muntin section;

(b) means for controlling the muntin section notching unit;

(c) at least one muntin section crimping unit operatively aligned with the notching unit, the crimping unit including a crimping device for forming retaining dimples in the muntin sections proximate the notch; and (d) means for controlling the crimping device.

The present system also includes means for feeding muntin sections to the system.

The system may also include a device for producing pierced muntin seating bars which are used to frame the muntin sections and seat them in a window or door. This may be accomplished by combining a notching device and a piercing device into one unit, thus permitting the device to alternate between notching and piercing operations or focusing on one to the exclusion of the other. Alternatively, the notching and piercing devices may be configured as separate units.

The means for controlling the notching unit is preferably a programmable controller such as a computer which permits automatic control of the system. The notching unit may also be controlled manually through a device such as a push button station. The means for controlling the notching unit is used to program such parameters as the number of notches and the distance between notches on a muntin section. The controller downloads the parameters to the notching unit and monitors the operation. The same means for controlling may be used for programming and monitoring the piercing device.

The means for controlling the muntin section crimping unit is preferably a manual push button station. A programmable controller may also be used therewith.

The means for feeding muntin sections to the system includes an automatic feeding unit which feeds muntin strips to the notching unit and feeds, where applicable, seating bars to the piercing device. The muntin sections and seating bars may also be manually fed to their respective units.

After the muntin sections are notched, a portion of the muntin sections are fed to the muntin section crimping unit which forms outwardly projecting dimples on both sides of the muntin sections below the notches and approximately medial thereto. The dimples are used to retain a non-dimpled muntin section in place after muntin sections are assembled.

The assembled muntin sections are usually assembled to the seating bars. Before assembly, keepers having at least one insert prong are inserted into apertures formed in the seating bar. The inserted keepers are so spaced as to correspond to lines or rows of assembled muntin sections. The muntin sections are installed over the keepers until they urge against the seating bar.

A plurality of seating bars form a boundary for the muntin sections, thus creating a muntin section lattice.

The present invention will be better understood with reference to the following detailed discussion and to the accompanying drawings in which like reference numerals refer to like elements.

BRIEF DESCRIPTION OF THE DRAWINGS

FIG. 4 is a diagram of a notching, piercing and crimping system in accordance with a fourth embodiment of the present invention;

FIG. 5 is an exploded perspective view of a pair of assembled muntin sections produced by the practice of the present invention;

FIG. 6 is a top plan view of a muntin lattice produced by the practice of the present invention;

FIG. 7 is an exploded partial view of a muntin section and seating bar assembly;

DETAILED DESCRIPTION OF THE PREFERRED EMBODIMENTS

Figure 1:
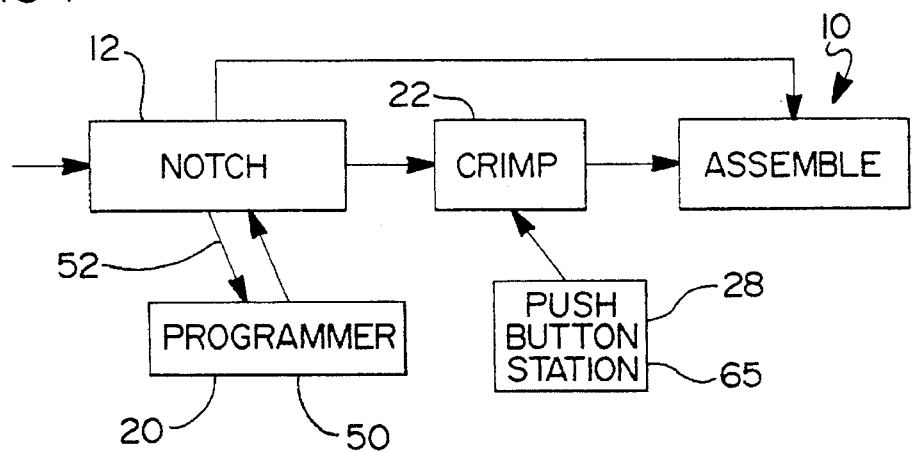
FIG. 1 is a flow chart of a notching and crimping system according to the present invention.
Figure 8:
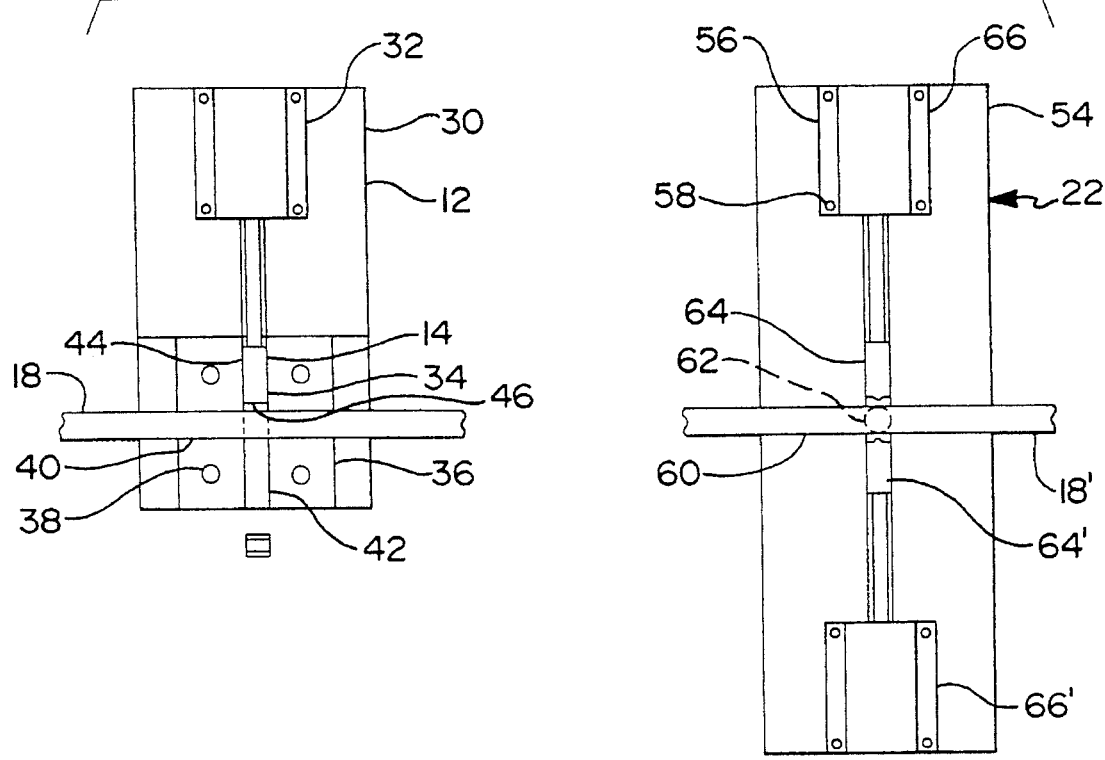
FIG. 8 is a front view of a notching unit and a crimping unit used in accordance with the present invention.

Now with reference to the drawings and, in particular, FIGS. 1, 5 and 8, there is depicted therein a first embodiment of a muntin section machining system, generally depicted at 10, in accordance with the present invention and which notches and crimps a muntin section. The system comprises:

(a) at least one muntin section notching unit 12, the unit 12 including means 14 for forming at least one notch 16 in a muntin section 18;

(b) means 20 for controlling the muntin section notching unit 12;

(c) at least one muntin section crimping unit 22 aligned with the notching unit 12 and including means 24 for forming retaining dimples 26 in a notched muntin section 18' proximate the notch 16; and (d) means 28 for controlling the muntin section crimping unit 22.

The notching unit 12 is preferably a pneumatically operated unit 12, but may also be operated electrically or hydraulically. The unit 12 includes a support frame 30 having a cylinder 32 removably mounted to the support frame 30. A notching device 34, which defines the means 15 for notching, is removably attached to the cylinder 32 and extends downward therefrom. The device 34 is put in motion by the cylinder 32 to contact and cut the muntin section 18 and then retracted by the cylinder 32. A positioning jig portion 36 is disposed on the support frame 30 for holding and positioning the muntin section 18 in the notching unit 12. The jig portion 36 is removably attachable to the support frame 30 by fasteners 38, such as screws etc. and aligned with the notching device 34. The jig portion 36 includes a seating slot 40 for positioning and holding a muntin section 18 and a guide track 42 in open communication with the seating slot 40 to guide the notching device 34 to the muntin section 18. The notching unit 12 is commercially available from McKeegan Equipment and Supply Company of Plymouth, Mich.

The notching device 34 of the notching unit 12 is preferably a cutting blade 44 made from cold working tool steels which are commonly known to those persons skilled in the art. The cutting blade 44 has a trimming edge 46 which is maintained in a sharpened condition to cut through the muntin section 18. The device 34 forms the notch 16 in the muntin section 18 by cutting at least one portion 48 of the muntin section 18 from a top half of the muntin section 18. The cutting blade 46 is translated to and through the muntin section 18 with great force by the cylinder 32 causing the blade 44 to sever the portion 48 of the muntin section 18 from the section 18 with few or no burrs.

The means 20 for controlling the notching unit 12 is preferably a programmable controller 50 such as a computer which is commonly known to those skilled in the art. The controller 50 is in electronic communication with the notching unit 12. The controller 50 is programmed with the parameters, such as number of notches and distance between notches, needed to produce the notched muntin section 18' and the parameters are downloaded to the notching unit 12 via an electronic communication link 52.

The notched muntin sections 18' are crimped by the crimping unit 22. Preferably the crimping unit 22 is operatively aligned or coaxial with the notching unit 12 to form a machining line.

The crimping unit 22 includes a base structure 54 having at least one cylinder 56 removably attached thereto. Preferably there are two opposing and aligned cylinders 56, 56' removably attached to the base structure 54 by fasteners 58, such as screws, etc.

The base structure 54 has a channel 60 formed therein for receiving and positioning notched muntin sections 18' therein. The means 24 for forming retaining dimples comprises at least one crimping device 62 attached to the base structure 54 and at least one forming die 64 and, preferably, a pair of opposed dies 64, 64'. An extendable and retractable cylinder 66, 66' is operatively connected to an associated die 64, 64'. The crimping device 62 is disposed substantially medial of the channel 60 of the base structure 54 and is aligned with the forming dies 64, 64'. The crimping device 62 comprises a crimping blade 68 made from a cold working tool steel which is commonly known to those skilled in the art.

In use, a notched muntin section 18' is placed over the crimping blade 68 such that the blade 68 enters the notch 16 of a section 18. When the muntin section 18 is seated or resting on the blade 68, one cylinder 66, 66' is activated, causing the associated forming die 64, 64' to extend to and urge against the muntin section 18' forming a first retaining dimple 26 or 26' on one side of the section 18'. After the dimple is formed and as the cylinder retracts, the second cylinder activates causing the second forming die 64 or 64' to extend to and urge against the opposite side of the muntin section 18, forming a second retaining dimple on the opposite side of the muntin section. After the retaining dimples 26, 26' are formed, the muntin section 18' is moved to the next notch 16 and the dimple forming operation is repeated.

The means 28 for controlling the crimping unit 22 is preferably a push button station 65 which is operated manually and is in electronic communication with the crimping unit 22. The push button station is commonly used and is well known in the art. However, a programmable controller similar to those previously described may be used.

Not all the notched muntin sections 18' need to be crimped. Approximately half of the muntin sections 18' that are required for a muntin lattice 70 are notched and crimped. This provides for a sufficient number of crimped and non-crimped muntin sections 18', 18" to assemble the muntin lattice 70. The lattice 70 is essentially configured to have the half of the muntin sections 18" that are crimped to receive and secure the half of the muntin sections 18" that are not crimped.

Figure 2:
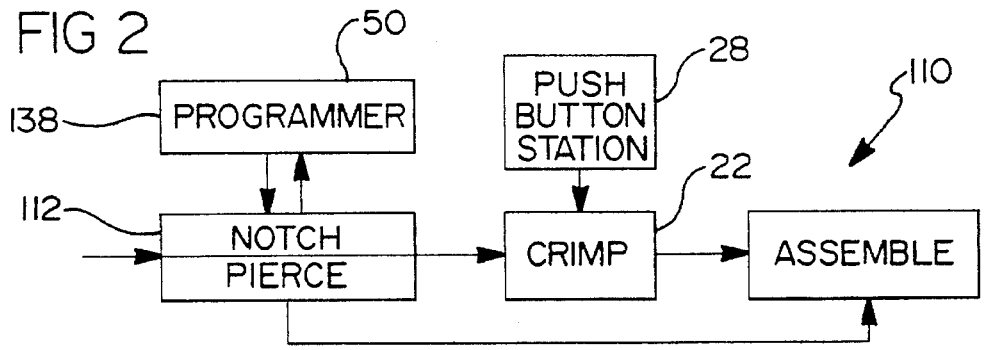
FIG. 2 is a flow chart of a notching, piercing and crimping system in accordance with a second embodiment of the present invention.
Figure 10:
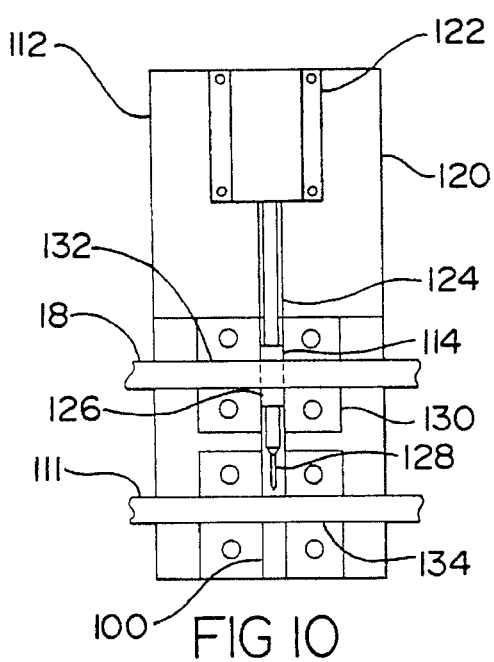
FIG. 10 is a front view of a combined notching and piercing unit in accordance with the present invention.

As shown in FIGS. 2 and 10 and in another aspect of the present invention, the system 110 may also notch a muntin section 18 and pierce a seating bar 111 in a single unit. The system 110 is defined by a combined unit 112 comprising means 114 for notching a muntin section 18 and piercing a seating bar 111. The means 114 forms at least one notch 18 in a muntin section and at least one aperture 116 in the seating bar 111. The aperture 116 receives a keeper 118 as shall be described in greater detail below. The combined unit 112 includes a base frame 120 which has a cylinder 122 removably attached thereto. The means 114 comprises a combined notching and piercing device 124 operatively connected to the cylinder 122 at one end thereof and extends therefrom. The notching and piercing device 124 is a unitary tool having a notching blade 126 disposed thereon and a piercing tool 128 disposed at the free end of the device 124 below the notching blade 126, as shown.

The notching and piercing unit 112 further includes a jig portion 130 removably attached to the base support 120. The jig portion 130 has a first seating slot 132 for positioning muntin sections 18 and a second seating slot 134 below the first seating slot 132 for positioning seating bars 111. The jig portion 130 also includes a slide slot 136 for guiding the notching and piercing device 132 which is in open communication with the first seating slot 132 and the second seating slot 136. The slide slot 136 is essentially normal to the first seating slot 132 and second seating slot 134.

The cylinder 122 operatively extends the notching and piercing device 124, translating the device 124 through the slide slot 136 of the jig portion 130. In the extended position, the notching blade 126 enters the first seating slot 132 of the jig portion 130 and moves therethrough while notching a muntin section 18 disposed therein. At the same time, the piercing tool 128 enters the second seating slot 134 of the jig portion 130 and pierces a seating bar 111 disposed therein. Thus, as described above, the notching and piercing operations are accomplished by one unit 112.

A means 138 for controlling the combined notching and piercing unit 112 is preferably a programmable controller 50 similar to those previously described herein. However, a push button station may also be used to control the combined unit 112.

Figure 3:
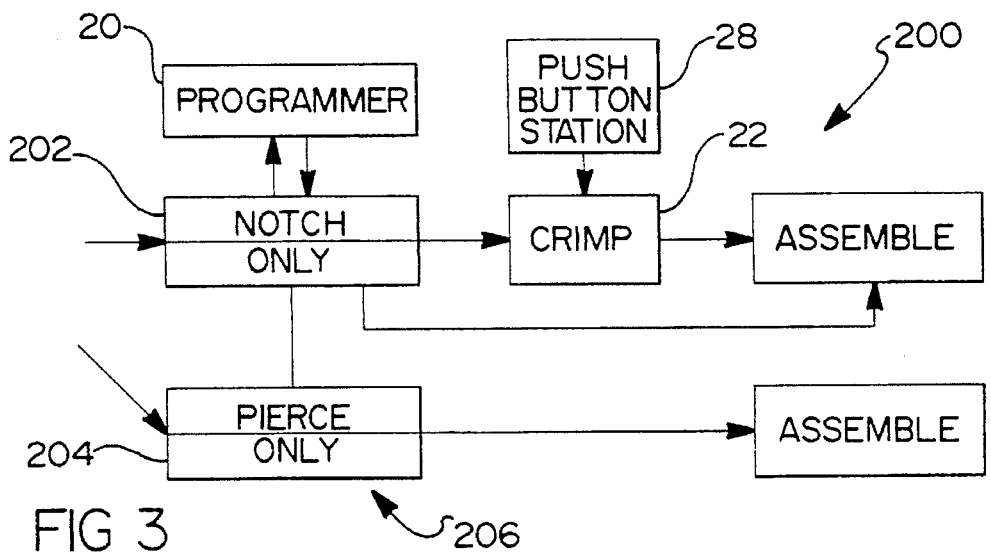
FIG. 3 is a flow chart of a notching, piercing and crimping system in accordance with a third embodiment of the present invention.
Figure 9:
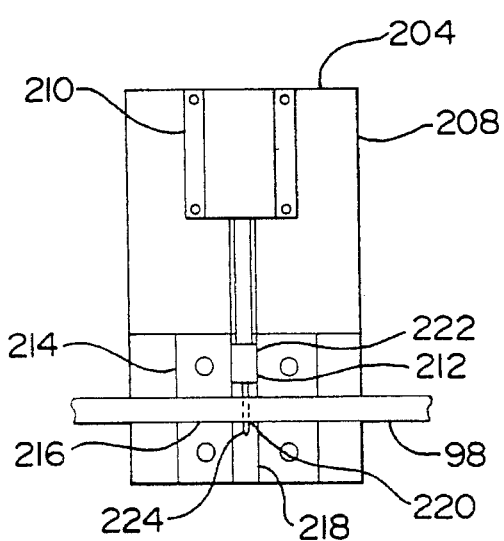
FIG. 9 is a front view of a piercing unit used in the practice of the third embodiment of the present invention.

Alternatively, and as shown in FIGS. 3 and 9, the notching and piercing unit may be independent units. The system thus comprising a notching unit 202 such as that previously described and separate piercing unit 204 for piercing seating bars 111. The piercing unit 204 is preferably disposed in a machining line parallel with a notching and crimping machining line. The two units 202 and 204 may be included in one system 200. This may be accomplished by installing or adding a piercing processing line 206 parallel with the notching and crimping system.

As shown in FIG. 9, the piercing unit 204 includes a base frame 208 having a cylinder 210 removably attached thereto. Removably attached to and extending from the cylinder 210 is a piercing device 212 for piercing the seating bars 98. The base frame 208 also includes a jig portion 214 which is removably attached thereto below the cylinder 210. The jig portion 214 has a seat 216 formed therein for positioning the seating bars 111. Also, the jig portion 214 has a slot slide 218 formed therein for guiding the piercing device 212. The slot slide 218 is essentially normal to and in communication with the seat 216. Operatively, the cylinder 210 extends and retracts the piercing device 212 translating the device 212 through the slot slide 218 into and from the seat 216. When the piercing device 212 is extended, the device 212 forms at least one aperture 220 in a seating bar 111 disposed within the seat 216.

The piercing device 212 is a unitary tool which is attached to the cylinder 210 at one end and having a hole punch portion 222 disposed on the opposite end. The piercing device 210 is preferably made from a cold forming tool steel commonly known to those skilled in the art. The hole punch portion 222 includes at least one aperture forming punch 224 and preferably two punches (only one of which is shown) to accommodate a two prong keeper 118. The punches pierce the seating bar 111 and form two apertures, only one of which is shown at 220. The apertures receive the two prong keeper 118 at assembly. The piercing unit 204 is known and commercially available such as that available from McKeegan Equipment and Supply Company of Plymouth, Mich.

In FIG. 4, there is shown a fourth embodiment of a system 300 in accordance with the present invention. The system 300 includes a first machining line having a notching and piercing unit 302 operationally aligned with a crimping unit 304, a notching unit 306 and operationally aligned with a second crimping unit 304 in a parallel machining line. In all other respects, the systems is the same as previously described heretofore.

In accordance with the preferred embodiment and as shown in FIG. 2, a method for machining muntin sections 18 and seating bars 111 in accordance with the present invention includes the steps of:

(a) feeding a plurality of muntin sections to a notching device;

(b) cutting the muntin sections to form at least one notch therein;

(c) feeding a plurality of seating bars to a piercing device;

(d) piercing the seating bar to form at least one aperture therein;

(e) transferring at least one notched muntin section to a crimping unit;

(f) crimping the notched muntin section such that at least one outwardly projecting retaining dimple is formed in the side of the muntin section medially of the notch;

(g) transferring the crimped muntin section to the assembly station;

(h) transferring at least one notched muntin section to an assembly station; and (i) transferring the pierced seating bar to the assembly station.

After the muntin sections and the seating bars are machined, they are assembled at the assembly station by:

(j) inserting the keeper into the aperture of the seating bar;

(k) mounting the notched muntin section to the notched and crimped muntin section such that the dimple engages and retains the uncrimped muntin section; and (l) connecting the assembled muntin sections to the seating bar such that the ends of the muntin sections are installed onto the keeper and urge against the seating bar.

The above method of machining muntin sections and seating bars may be initiated by programming the means for controlling the machining units with parameters for notching the muntin sections and piercing the seating bars. The parameters are downloaded to the machining units, except the crimping unit which is operated via push buttons, and the processing is monitored by the means for controlling.

In an alternative method thereof, the present invention 200 may be practiced with a separate notching unit 202 and a separate piercing unit 204 wherein the piercing unit 204 and the notching unit 202 are parallel machining lines, one line machining muntin sections 18, the other line machining seating bars 111.

In a fourth alternative method, the present invention 300 may be practiced with a second machining line having a notching unit dedicated to notching muntin sections that are not to be crimped. This method permits the notching and crimping line to be dedicated to only muntin sections that are to be notched and crimped.

The present invention substantially improves the quality and longevity of a muntin lattice. Also, the system greatly increases muntin lattice production and substantially reduces labor costs. This provides for a long-lasting aesthetically pleasing window or door.

Having thus described the present invention, what is claimed is:

1. A system for machining muntin sections comprising:
   (a) at least one muntin section notching unit, the unit comprising means for forming at least one notch in a muntin section;
   (b) means for controlling the muntin section notching unit;
   (c) at least one muntin section crimping unit adjacent the notching unit, the crimping unit including means for forming at least one retaining dimple in the at least one muntin section proximate the notch; and
   (d) means for controlling the muntin section crimping unit.

2. The system of claim 1, further comprising:
   (a) a seating bar piercing unit proximate the notching unit and crimping unit, the piercing unit including means for forming at least one aperture in the seating bar; and
   (b) means for controlling the piercing unit.

3. The system of claim 2 wherein the means for controlling the piercing unit comprises:
   a programmable controller in electronic communication with the piercing unit for downloading operating parameters thereto and monitoring the operation of the piercing unit.

4. The system of claim 1, wherein the means for controlling the crimping unit is a manual push button station in electronic communication with the crimping unit for operating the crimping unit.

5. The system of claim 1, wherein the means for controlling the notching unit comprises:
   a programmable controller in electronic communication with the notching unit for downloading operating parameters thereto and monitoring the operation of the notching unit.

6. The system of claim 1 wherein the at least one muntin section crimping unit is coaxially aligned with the notching unit.

7. A system for machining muntin sections and seating bars comprising:
   (a) a combined muntin section notching and seating bar piercing unit containing means for forming at least one notch in the muntin section and at least one aperture in the seating bar;
   (b) means for controlling the notching and seating unity;
   (c) at least one muntin section crimping unit, the crimping unit including means for forming at least one retaining dimple in at least one muntin section proximate the notch; and
   (d) means for controlling the crimping unit.

8. The system of claim 7 wherein the means for controlling the crimping unit is a manual push button station in electronic communication with the crimping unit.

9. The system of claim 7, wherein the means for controlling the notching and piercing unit comprises:
   a programmable controller in electronic communication with the notching and piercing unit for downloading operating parameters thereto and monitoring the operation thereof.

10. A method of machining muntin sections and seating bars comprising the steps of:
    (a) feeding a plurality of muntin sections to a notching device;
    (b) cutting the muntin sections to form at least one notch therein;
    (c) feeding a plurality of seating bars to a piercing device;
    (d) piercing the seating bars to form at least one aperture therein;
    (e) transferring at least one notched muntin section to a crimping unit;
    (f) crimping the notched muntin section such that at least one outwardly projecting retaining dimple is formed in the side of the muntin section medially of the notch;
    (g) transferring the notched and crimped muntin section to an assembly station;
    (h) transferring at least one other notched muntin section to the assembly station;
    (i) transferring the seating bar to the assembly station.

11. The method of claim 10, further comprising:
    (j) inserting at least one keeper into an aperture of the seating bar;
    (k) assembling the notched muntin section of the notched and crimped muntin section such that the dimple engages and retains the uncrimped muntin section; and
    (l) connecting the assembled muntin sections to the seating bar such that the ends of the muntin sections are installed onto the keeper and urge against the seating bar.

* * * * *